United States Patent [19]

Sacknoff

[11] Patent Number: 4,818,088
[45] Date of Patent: Apr. 4, 1989

[54] SIDE VIEW MIRROR MOUNTING ON A FOLDING DOWN FRONT WINDSHIELD

[76] Inventor: Eric Sacknoff, 1528 E. 91st St., Brooklyn, N.Y. 11236

[21] Appl. No.: 150,829

[22] Filed: Feb. 1, 1988

[51] Int. Cl.⁴ .................................................. G02B 7/18
[52] U.S. Cl. .................................... 350/632; 248/479; 350/606
[58] Field of Search ................ 248/466, 475.1, 479; 296/84 R, 84 A, 84 B; 350/606, 631, 632

[56] References Cited

U.S. PATENT DOCUMENTS

| | | | |
|---|---|---|---|
| 1,120,654 | 12/1914 | Taylor | 350/632 |
| 1,283,164 | 10/1918 | Hammond | 350/606 |
| 1,322,717 | 11/1919 | Morel | 248/479 |
| 1,362,856 | 12/1920 | Drake et al. | 350/606 |
| 1,478,689 | 12/1923 | Winans | 248/479 |
| 1,567,169 | 12/1925 | Patterson | 350/631 |
| 2,352,727 | 7/1944 | McMahon | 296/84 B |

Primary Examiner—John K. Corbin
Assistant Examiner—Martin Lerner
Attorney, Agent, or Firm—Gary Cohen

[57] ABSTRACT

A way of mounting a side view mirror onto a motor vehicle of the type having a folding down front windshield is disclosed, employing the hinge which otherwise joins the windshield unit onto the vehicle body. By aligning holes in the end of the side view mirror unit with the holes already present in the hinge, the mounting means which removably join the windshield unit onto the motor vehicle function simultaneously to removably join the mirror unit onto the motor vehicle, so that additional mounting means are omitted.

7 Claims, 2 Drawing Sheets

SIDE VIEW MIRROR MOUNTING ON A FOLDING DOWN FRONT WINDSHIELD

BACKGROUND OF THE INVENTION

The invention concerns, in general, the mounting of mirrors onto motor vehicles and, more particularly, the mounting of side view mirrors onto vehicles having a folding down type front windshield.

Many different motor vehicles have folding down type front windshields. These include boats, automobiles, such as e.g. vans or so-called "jeep" type vehicles, and trucks, among others.

In the past, most 'jeep' type vehicles have been designed and manufactured with removable doors. The side view mirrors are mounted onto the vehicle body by tapping additional holes into the hinges which join the front windshield onto the vehicle body and enable its folding down over the vehicle hood. Additional screws are thus needed for mounting the mirror frame with these additional holes, onto the hinge. In many jeep type vehicles, the hinge also serves as the bracket for mounting of the upper door hinge.

Recently, a number of jeep type vehicle models have been designed and manufactured with side view mirrors mounted, instead, on the removable doors. Accordingly, when the doors are removed, the vehicles are no longer equipped with side view mirrors. In this case, the manufacturers and dealers recommend that the side view mirrors be mounted by tapping new holes into the front windshield hinges. A side view mirror is then attached to the vehicle by being screwed into these new holes.

The disadvantage of this method of mounting the side view mirror is that with the arrival of cold weather, when the doors are put back onto the vehicle for a period of many months, the side view mirror that was added at the front windshield hinge must be removed. This leaves new holes in the hinge.

SUMMARY OF THE INVENTION

It is therefore an object according to the present invention to make available a means for mounting the side view mirror on motor vehicles having a folding down type windshield, without the need for additional mounting means such as e.g. new holes tapped into the vehicle.

This object is attained according to the present invention by having the elements which function as mounting means for the mounting of the front windshield hinge onto the vehicle, simultaneously function as mounting means for the mounting of the side view mirror onto the vehicle. In this manner, one avoids on the one hand the necessity for providing additional mounting means and, on the other hand, in particular the useless presence of superfluous holes, e.g. in the front windshield hinge, during the colder months.

The actual mounting means to be employed are preferably screw means, such as e.g. so-called Allen-type screws. To compensate for the additional space necessary to accomodate the side view mirror bracket and two washer means, preferably rubber or a synthetic such as polyvinyl chloride, polyurethane, among others, when the bracket is fastened to the windshield hinge through pre-existing holes, Allen-type screws of greater than usual length have to be provided.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1A:
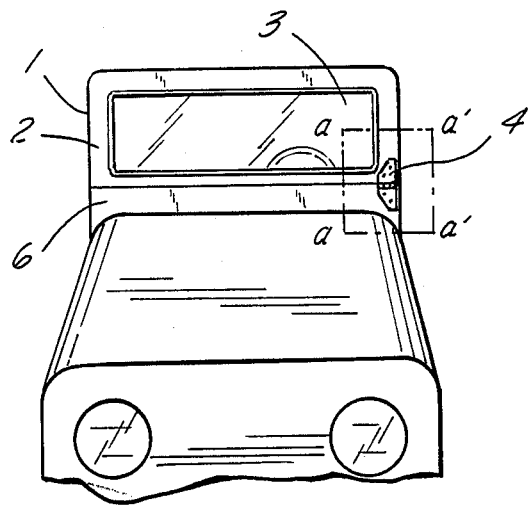
FIG. 1A is a front perspective view of a motor vehicle body, showing in particular the front windshield unit and the hinge whereby the same is attached to the vehicle.
Figure 1B:
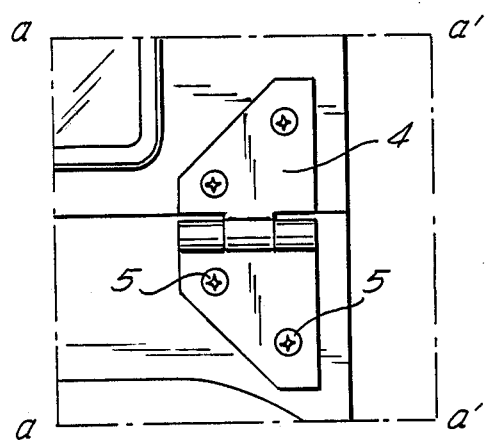
FIG. 1B is an enlargement of the hinge area from FIG. 1A, taken along lines a—a and a'—a' in FIG. 1A.

FIG. 1A shows the front windshield unit 1, which includes the window frame 2 surrounding the window 3, and also the hinges 4 (of which only one is shown for simplification). As seen in FIG. 1B, the hinges 4 are mounted by means of the screws 5 onto the vehicle body 6.

Figure 2:
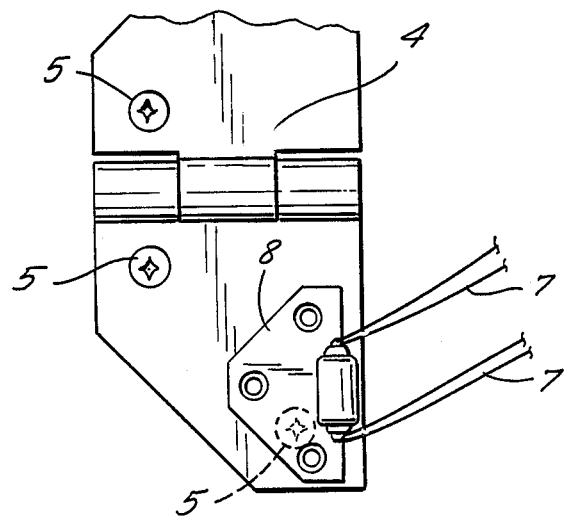
FIG. 2 is a schematic frontal view showing a previous technique for attachment of the sideview mirror onto the windshield hinge, using newly tapped holes.
Figure 3:
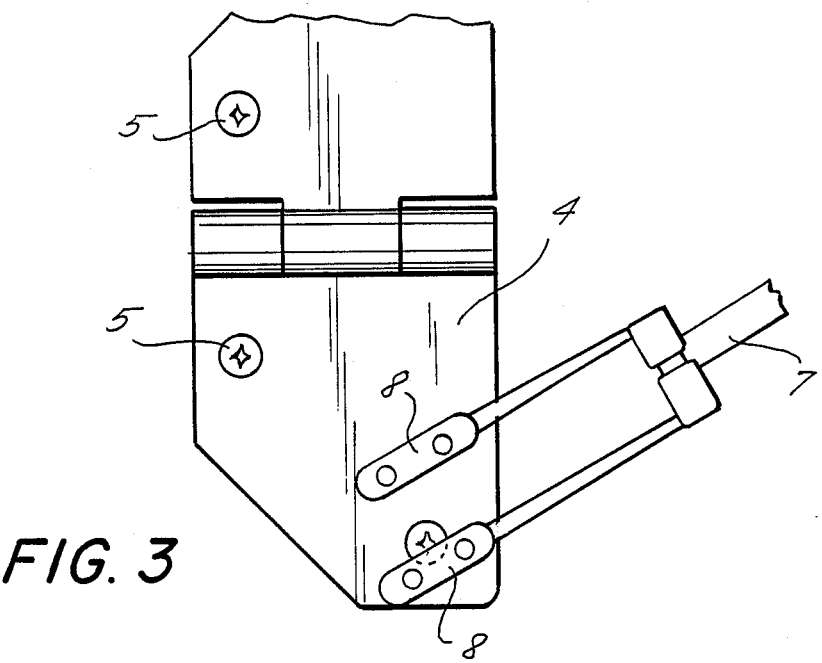
FIG. 3 is a schematic frontal view showing another previous technique for attachment of the sideview mirror onto the windshield hinge, likewise using newly tapped holes.

The older technique for mounting the side view mirror is exemplified in FIG. 2. Mirror frame 7, housing the mirror which is not shown, displays mounting means 8 at one end thereof. In this case, the mounting means are a plate with an angular adjustment joint for positioning the mirror. The mounting means 8 define a plurality of holes and require analogously situated, newly tapped holes in the hinge 4. FIG. 3 is similar, except that the mounting means 8 are of a different design.

Figure 4:
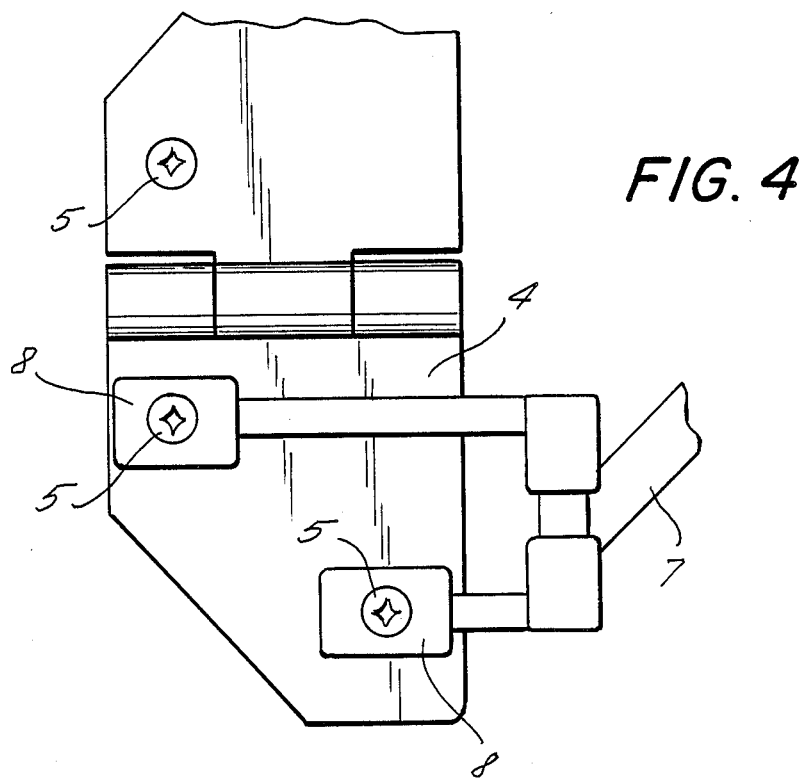
FIG. 4 is a schematic frontal view of the mounting of the sideview mirror according to the present invention, using only pre-existing holes.

According to the present invention, as seen in FIG. 4, the mounting means 8, e.g. two arms as shown, extending from an angular adjustment joint at the end of mirror frame 7, are removably fastened to the motor vehicle body through the front windshield hinge by means of the same screws that hold the hinge to the body. This avoids the need for additional mounting means, and represents a saving in terms of labor and materials costs, and also economy of design, which amounts to a significant advance in the field of art to which it belongs.

It will be understood that each of the elements described above, or two or more together, may also find a useful application in other types of combinations differing from the types described above.

While the invention has been illustrated and described as embodied in a side view mirror mounting on a folding down front windshield, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt if for various applications without omitting features that, from the standpoint of prior art, fairly constitute essential characteristics of the generic or specific aspects of this invention.

What is claimed as new and desired to be protected by Letters Patent is set forth in the appended claims.

1. In a combination side-view mirror unit and folding down type front windshield unit of a motor vehicle, of the type wherein
 said front windshield unit is composed of a window, a window frame housing said window and hinge means removably joining said windshield unit onto said motor vehicle,
 said hinge means including a plurality of holes for placement of means removably joining said windshield unit onto said motor vehicle, and
 said side-view mirror unit is composed of a mirror frame and mounting means disposed at one end of said mirror frame and removably joining said mirror unit onto said hinge means,
 the improvement wherein said mounting means include a plurality of openings and substantially align with said hinge means, thereby said means removably joining said windshield unit into said motor vehicle comprise means removably joining said mirror unit onto said motor vehicle, whereby additional mounting means are omitted.

2. The combination according to claim 1, wherein said motor vehicle comprises an automobile.

3. The combination according to claim 1, wherein said motor vehicle comprises a truck.

4. The combination according to claim 1, wherein said means removably joining said windshield unit onto said motor vehicle comprise screws.

5. The combination according to claim 1, wherein said mounting means comprise an angular adjustment joint and an arm extending from said joint, said arm including a plurality of openings.

6. The combination according to claim 5, wherein said arm displays a plurality of tines which include said plurality of openings, thereby allowing for mounting of said mirror unit by sliding said tines adjacent said means removably joining said windshield unit onto said motor vehicle.

7. The combination according to claim 5, wherein said arm includes a plurality of holes which substantially align with said hinge means.

* * * * *